United States Patent
Cuneo et al.

[11] Patent Number: 5,549,014
[45] Date of Patent: Aug. 27, 1996

[54] WORKCENTRE

[75] Inventors: Giuseppe Cuneo, Calolzio Corte; Sergio Bonacina, Galbiate, both of Italy

[73] Assignee: Black & Decker Inc., Newark, Del.

[21] Appl. No.: 346,993

[22] Filed: Nov. 30, 1994

Related U.S. Application Data

[63] Continuation of Ser. No. 59,446, May 7, 1993, abandoned, which is a continuation of Ser. No. 26,374, Mar. 4, 1993, abandoned.

[30] Foreign Application Priority Data

Mar. 5, 1992 [GB] United Kingdom .................... 9204772

[51] Int. Cl.$^6$ ...................................... F16H 1/14
[52] U.S. Cl. ........................................... 74/424.84
[58] Field of Search ...................... 74/424.8 A, 479 PH

[56] References Cited

U.S. PATENT DOCUMENTS

| | | | |
|---|---|---|---|
| 3,831,460 | 8/1974 | Linley, Jr. | 74/424.8 A |
| 3,977,269 | 8/1976 | Linley, Jr. | |
| 4,434,677 | 3/1984 | Linley, Jr. | |
| 4,593,572 | 6/1986 | Linley, Jr. | |
| 4,729,536 | 3/1988 | Scala | 74/479 PH |
| 4,753,122 | 6/1988 | Nishikawa et al. | 74/424.8 A |
| 5,101,679 | 4/1992 | Smith et al. | 74/424.8 A |
| 5,157,985 | 10/1992 | Yamazaki et al. | 74/479 PH |
| 5,265,491 | 11/1991 | Nishiumi | 74/479 PH |

FOREIGN PATENT DOCUMENTS

| | | | |
|---|---|---|---|
| 1389630 | 12/1965 | France. | |
| 2526082 | 2/1976 | Germany. | |
| 203108 | 10/1983 | Germany | 74/424.8 A |
| 63034045 | 7/1988 | Japan. | |
| 2160440 | 9/1990 | Japan. | |
| 0351623 | 1/1990 | WIPO. | |

*Primary Examiner*—John T. Kwon
*Attorney, Agent, or Firm*—Charles E. Yocum; Dennis A. Dearing; Frederick H. Voss

[57] ABSTRACT

A workcenter comprises a track (14) having a carriage (24) moveable along the track by a screw (32) rotated by a motor (30). The carriage has a bore (42) surrounding the screw. Two sleeve members (160) are received in the bore at either end thereof and surround said screw. The sleeve members are segmented and have threads for engagement with the screw. The sleeve members are pressed radially into engagement with the screw by a spring ring (198). The sleeve members are constructed from deformable plastics material and are screwed onto the screw against the opposite shoulders (163) around the bore in the carriage sufficient to deform the threads so as to take up axial freedom of movement between the carriage and screw. This arrangement allows an inexpensive rolled steel screw having inherent inaccuracies to be employed without loss of positional accuracy.

6 Claims, 4 Drawing Sheets

WORKCENTRE

This application is a continuation of continuation application Ser. No. 08/059,446, filed May 7, 1993. Ser. No. 08/059,446 is a continuation of application Ser. No. 08/026,374, filed Mar. 4, 1993, now both abandoned.

BACKGROUND OF THE INVENTION

This invention relates to workcenters of the type comprising a power tool mounted in a frame for movement in three dimensions under manual or automatic control.

Such workcenters are known, and usually comprise three linear movement tracks arranged along orthogonal axes. Each track may comprise an extruded section girder mounting a carriage moveable along the track in a first direction. The carriage may then carry a second girder, arranged in second, perpendicular, direction. It has its own carriage moveable in that direction and carries a third girder. The third girder is arranged in a third direction, perpendicular to the first and second directions, and carries a third carriage moveable in that direction. The third carriage carries the tool which is thus positionable at any point in space within the confines of the allowable movement of the carriages in their respective tracks.

How each carriage is mounted in each track is a matter of design choice, but to ensure sufficiently accurate movement of the tool carried on the third carriage, each carriage must only have freedom of movement along its respective axis and, moreover, its position along the track must be determinable with accuracy. Otherwise, the workcenter will not have sufficient accuracy to perform useful functions.

The present invention is concerned with the positioning of a carriage along its track. Several methods are available for driving a carriage. For example, a rack and pinion arrangement may be employed, or an endless toothed belt may be connected to the carriage and driven by a motor, or indeed a worm-drive screw may be rotated by a motor and passing through a correspondingly threaded nut on the carriage. The present invention is concerned with the latter arrangement.

A worm drive is a satisfactory arrangement because it can be driven directly by a stepping motor capable of rotating in many discrete steps per rotation resulting in very fine movements of the carriage. Hitherto, however, the problem with this arrangement is that to achieve the required accuracy, a very accurately machined worm drive screw of length equal to the maximum permissible movement of the carriage must be provided. Such a screw, and the nut which cooperates therewith, are together very expensive to manufacture. It is therefore an object of the present invention to provide an arrangement whereby a much less expensive rolled steeled screw can be employed without significant loss of accuracy. Such a screw has hitherto not been used because it is liable to dimensional inaccuracy which precludes a close fitting nut. U.S. Pat. No. 3,831,460 describes an anti-backlash nut which goes some way towards overcoming this problem but is not a complete solution.

SUMMARY OF THE INVENTION

Thus in accordance with a first aspect of the present invention there is provided a workcenter comprising a track having a carriage moveable along the track by a screw rotated by a motor, the carriage having a bore surrounding said screw, and two sleeve members received in the bore at either end thereof and surrounding said screw, said sleeve members being segmented along at least part of their length and said segmented region being provided with threads for engagement with said screw and being pressed radially into engagement with said screw, at least the threads of said sleeve member being constructed from deformable plastics material and each sleeve member being screwed onto said screw against opposite shoulders around the bore in the carriage sufficient to deform said threads so as to take up axial freedom of movement between said carriage and screw.

Preferably some degree of radial freedom of movement between said carriage and screw is provided by said sleeve members being a loose fit, at least over said threaded region, in the bore.

Preferably said segmented and threaded regions of the sleeve members are resiliently pressed radially into engagement with said screw by a spring ring disposed on a circumferential groove around said sleeve segments. Preferably each sleeve member is formed from two halves connected together by mutually engaging studs and sockets on each side of each half sleeve. In this connection region, the sleeve is preferably in the form of a closed annulus having a bore of diameter sufficiently large to receive the screw with some radial clearance. Preferably a flange is formed on this annular end of the sleeve for abutment against a shoulder in the bore of the carriage. An end cap may be adapted to press said flange against said shoulder to lock the sleeve against rotation in the bore of the carriage.

To assemble the carriage in the track, the carriage is first of all fitted in the track for free movement along the track. The worm drive screw is arranged to pass through the bore of the carriage. Then, at any convenient location along the worm drive screw, the sleeve halves are snapped into engagement with each other around the screw to form sleeves, one at either side of the carriage. The spring ring is arranged on the sleeve to press the threads of the sleeve into engagement with the threads of the screw. The carriage is then fitted over the first sleeve until its flange abuts the shoulder on the carriage. The second sleeve is then screwed along the screw until its flange abuts the other shoulder of the carriage. The sleeve is then turned a further amount to tighten the two sleeves against the ends of the carriage and further to deform slightly the threads of each sleeve. Preferably, each sleeve is made entirely of deformable plastics material such as for example plastics sold under the trade marks Nylon and Stanley. By constructing the threads, or indeed the whole sleeve, from deformable plastics material and moreover by rendering the sleeves segmented and resiliently pressed radially inward, then should irregularities be encountered as the screw is rotated and the carriage progresses along the screw, those irregularities can be accommodated by deformation of the threads, or radial displacement of the sleeve segments, without losing axial "tightness" of the carriage with respect to the screw. Although the sleeves are screwed onto the screw so that they are tight with respect thereto, and under some permanent deformation, nevertheless this fact does not increase significantly the friction between the sleeves and screw which is still sufficiently freely rotatable not to impose inordinate stress on the motor driving it.

In a second aspect the present invention provides a workcenter comprising a track having a carriage moveable along the track by a screw rotated by a motor, the carriage having a bore surrounding said screw, and at least one sleeve member received in the bore and surrounding said screw, said sleeve member being segmented along at least a part of its length and said segmented region being provided with threads for engagement with said screw and being pressed radially into engagement with said screw, said sleeve me into engagement with said screw, said sleeve member being constructed from deformable plastics material in two halves mating together along sides parallel the axis of the sleeve. Preferably the two sleeve halves are interconnected by mutually engaging studs and sockets, one part on each side of each half sleeve.

In a third aspect of the present invention there is provided a workcenter comprising two parallel tracks each having a carriage movable along the track by a screw rotated by a motor, each carriage having a bore surrounding said screw, a sleeve member being received in one end of each bore surrounding said screw, said sleeve members being segmented along at least part of their lengths and said segmented regions being provided with threads for engagement with said screw and being pressed radially into engagement with said screw, at least the threads of said sleeve member being constructed from deformable plastics material, a third track being fixed between said carriages, said sleeve members being mounted in opposite ends of said bores with respect to said third track.

When the third track and carriage arrangement are sufficiently rigidly held in relation to said two parallel tracks, the deformation of said threads so as to take up axial freedom of movement between each carriage and screw can be achieved without the necessity of providing two sleeve members in each carriage. Thus a single motor can still be employed, one screw being directly driven by the motor, the other screw indirectly (for example by a belt and pulley arrangement), which would be not feasible if two sleeve members were used in each carriage together offering more resistance than a single motor could overcome. Thus a very precise and accurate control of movement of said third track can be achieved.

The invention is further described hereinafter, by way of example only, with reference to the accompanying drawings.

DETAILED DESCRIPTION OF THE PREFERRED EMBODIMENTS

Figure 1:
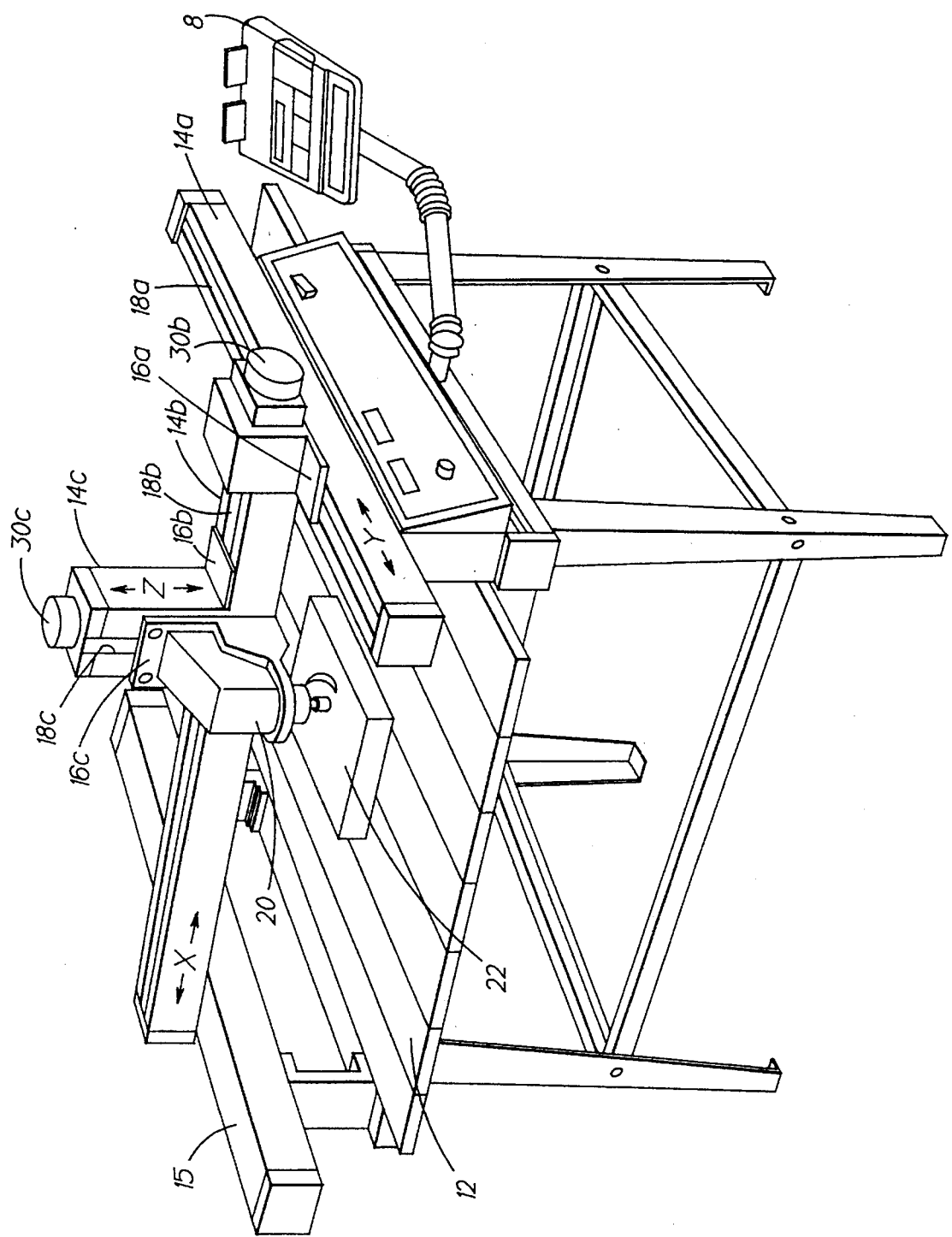
FIG. 1 is a schematic view of a workcenter according to the present invention.

A workcenter 10 comprises three box section type girder tracks 14a, b and c arranged in three orthogonal directions y, x, z respectively. Each track mounts a carriage (not shown), plate parts 16a, b, c of which project through top slots 18a, b, c of each track respectively. Plate 16a mounts one end of the track 14b whose other end is supported on a bar 15. The plate part 16b supports the track 14c and the plate part 16c carries a tool 20 for carrying out cutting operations on a workpiece 22 mounted on a table of the workcenter 10.

Figure 2:
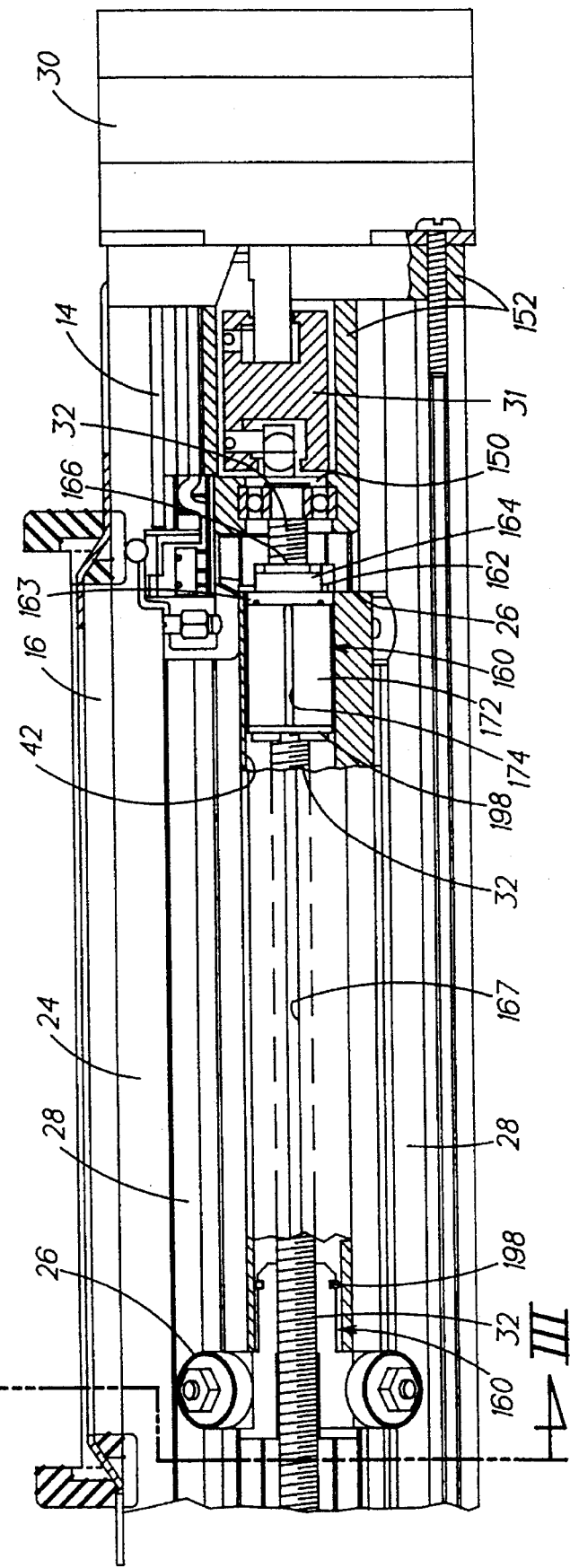
FIG. 2 is a side view in different sections through a track and carriage according to the present invention.
Figure 3:
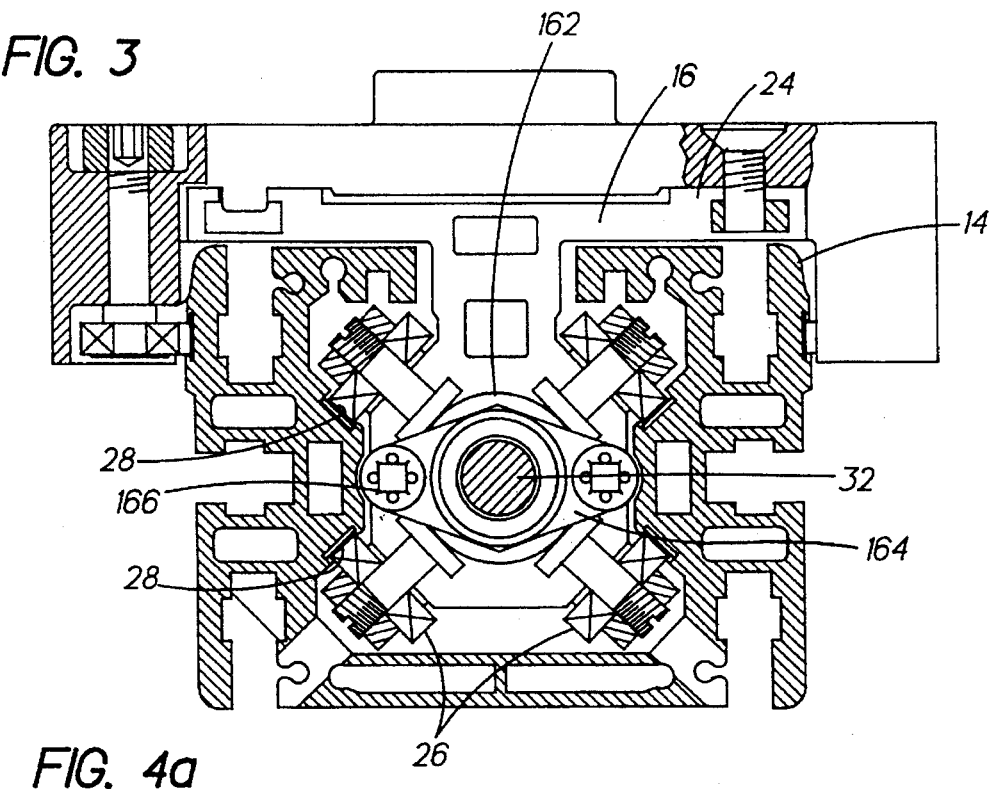
FIG. 3 is a section along the lines III—III in FIG. 2.

Turning to FIGS. 2 and 3, the track 14 supports a carriage 24 which has wheels 26 arranged in the form of a cross and adapted to roll along surfaces 28 formed in the track 14.

The carriage 24 is driven along the track 14 by a motor 30 which, through a coupling 31 rotates a worm drive screw 32. One end of the screw 32 is supported by a bearing 150 mounted in an end plate 152 and to which the motor 30 is secured. The screw 32 passes through a bore 42 of the carriage 24.

Two sleeves 160 are fitted in each end of the bore 42 and clamped in place by end caps 164 secured by screws 166 screwed into slots 167 formed on either side of carriage 24.

Figure 4A:
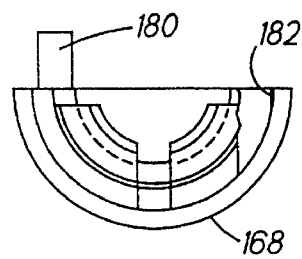
FIG. 4a, 4b and 4c are different views of a sleeve half according to the invention, FIG. 4a being an end view, partly in section, FIG. 4b being a plan view and FIG. 4c being a detail of part of FIG. 4b.

Referring to FIGS. 4a, b and c, each sleeve comprises two sleeve halves 168 connected together by mutually engaging studs 180 and sockets 182 formed at one end of each sleeve half. At this end of the sleeve, the two halves form a closed annulus having a bore of diameter sufficient to clear the threads on the screw 32. The remaining length of the sleeve 160 comprises four long segments 172 separated by deep slots 174. The slotted end of the sleeve 160 (about half the length of the segmental regions 172) is provided with internal threads 170 which correspond with the threads of the screw 32. The two halves 168 of the sleeve 160 are not identical, but this is only because the threads 170 must be arranged to form a continuous helix and this would not be achieved if the two halves were identical.

Figure 5A:
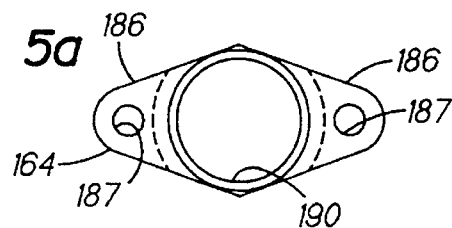
FIG. 5a and 5b are different views of an end cap for said sleeve, FIG. 5a being a plan view in the direction of arrow A in FIG. 5b and FIG. 5b being a side section; and, FIG. 6 is a plan view, partly sectioned, of another embodiment of a workcenter according to the present invention.
Figure 5B:
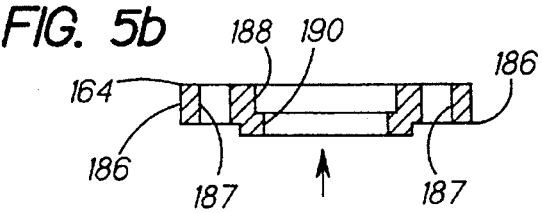
Figure 4B:
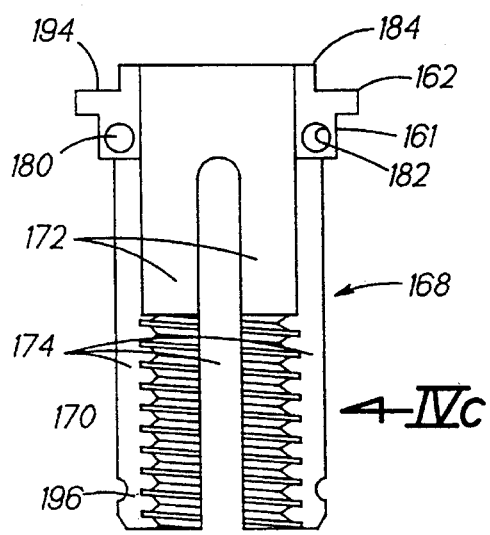
Figure 4C:
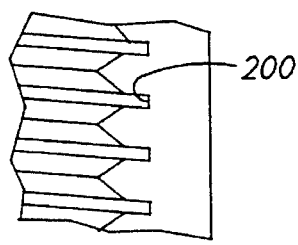

As mentioned above, when the sleeve 160 is formed from its two halves a cylindrical surface 161 is formed around the sleeve, and this surface is a close fit in the bore 42. A flange 162 is formed on the sleeve 160, and this abuts shoulder 163 at the ends of the bore 42. A rim 184 is formed on the end of the sleeve 160. Turning to FIGS. 5a and b, the end cap 164 has wings 186 provided with bores 187 adapted to receive the screws 166, and two internal cylindrical surfaces 188, 190 separated by a shoulder 192. The surfaces 188, 190 correspond with the flange 162 and rim 184 respectively. Moreover the depth of the surface 188 is slightly less than the height of the rim 184, so that, when the end cap is positioned over the end of the sleeve 160 and is screwed to the carriage 24, the sleeve 160 is firmly pressed against the shoulder 163 on the end of the carriage 24 and is prevented thereafter from making any movement relative to the carriage 24. However before the end cap is tightened to the carriage 24, each sleeve 160 is screwed on the worm drive screw 32 into the bore 42 until the position shown in FIG. 2 is reached. The sleeve member 160 is constructed from a deformable plastics material such as Nylon or Stanley and the threads 170 are pressed into engagement with the threads of screw 32 by the spring ring 198 which is received in a circumferential groove 196 formed near the end of the segmental regions 172 of sleeve 160. The sleeve 160 is screwed onto the screw 32 so that the flange 162 is tight against the shoulder 163. The threads 170 on each sleeve member 160 of either end of the carriage 24 are, as a result, individually deformed according to any localised irregularities of the threads on the screw 32. In the second place, they are collectively displaced both axially away from the opposite sleeve member and slightly in a radially outward direction. Such displacement expands the spring ring 198 to a small extent within the confines within the bore 42.

To reduce the possibility of binding the threads 170 on the screw 32 when the irregularities in the screw conspire to allow the threads 170 to be squeezed radially inwardly by the spring ring 198, the base of the threads 170 are provided with a deep helical groove 200 (see FIG. 3c) which prevents the edge of the threads on the screw 32 from contacting the base of the threads 170.

The friction between the plastics material of the sleeves 160 and the screw 32 is not sufficient to overload the motor 30, despite the tightness of the connection between them. The motor turns the screw 32 according to instructions from a control centre 8 (FIG. 1) and as it rotates, the screw drives the carriage 24 back and forth along the track 14. Because the two sleeves 160 are, in a sense, permanently in tension, the axial position of the carriage with respect to the screw is almost assured. Should variations occur in the thread then the fact that the sleeves are constructed from plastics material, the fact that the segments 172 allow expansion of sleeves and the fact that there are two of them in relative tension, ensures that such variations can be accommodated without loss of positional accuracy.

The arrangement described herein therefore allows a screw 32 to be used which otherwise would not have the requisite accuracy for use in a workcenter 10. If the tool 20 is to be guided with any precision, there is required a high degree of precision in the movement of the carriages 24 and plates 16 along with their respective tracks 14. Thus, instead of having to employ an expensive machined worm drive screw, the considerably less expensive rolled steel screw can be employed instead.

Figure 6:
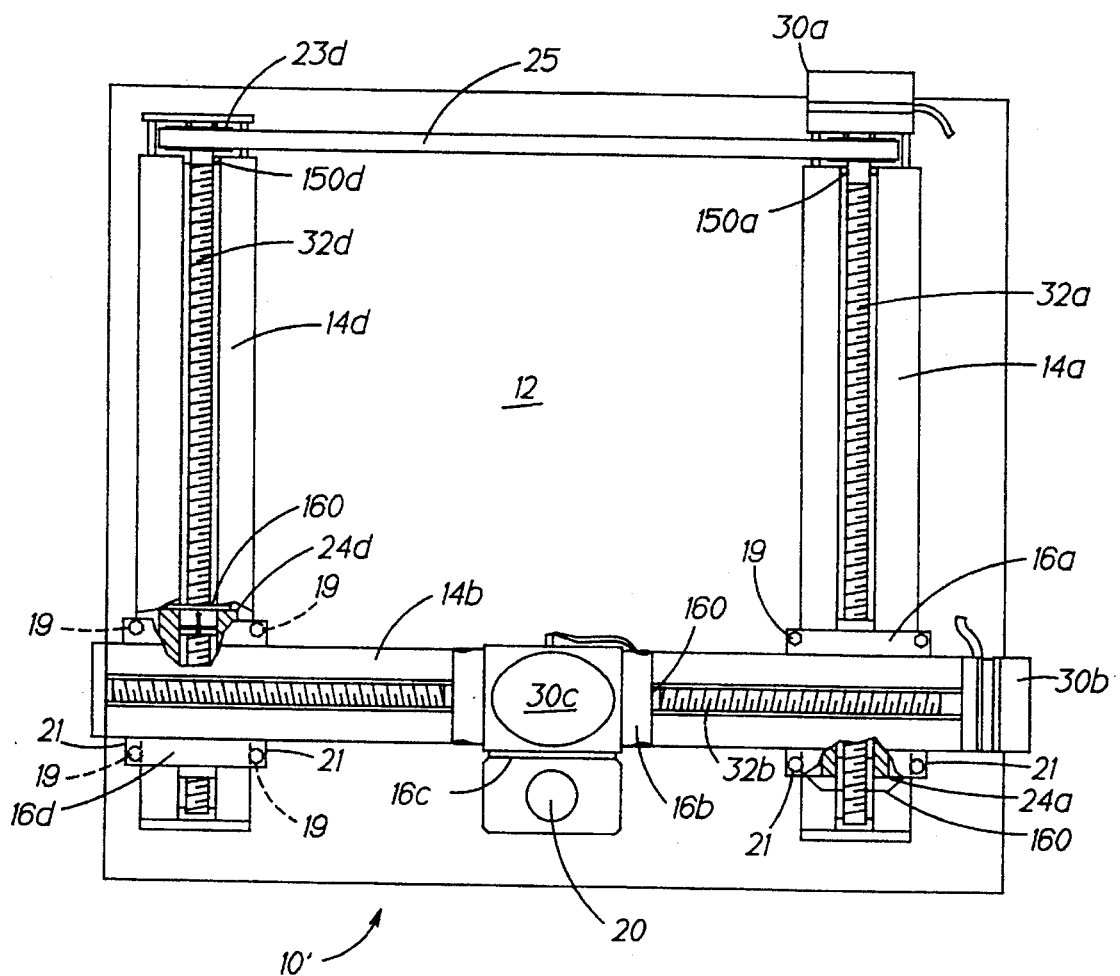

Referring to FIG. 6, a workcenter 10' of even greater positional rigidity is shown. Here the mere support bar 15 of FIG. 1 is replaced by a further girder track 14d, screw 32d and carriage 24d arranged parallel the track 14a at the other end of the track 14b.

The track 14b is supported on the carriage plate 16a and a further carriage plate 16d on the carriage 24d. Moreover, these carriage plates are arranged to have legs 21 extending on either side of each track 14a, 14d and bearing against each side through wheels 19 journalled in the legs at each corner of the carriage plates 16a, 16d (see also FIG. 3). This ensures a very rigid structure maintaining accurately the perpendicularity of the track 14b with respect to the track 14a. Screw 32d is driven by a pulley 23d arranged at one end and a belt 25 around another pulley 23a between the motor 30a and screw 32a.

However, if a sleeve 160 was employed at the end of each carriage 24a, 24d then the motor 30a would have insufficient torque to overcome the combined resistances of the carriage, not to mention the extra loads imposed by the extra screw 32d and belt and pulley arrangement 23,25. However, it is found that employing one sleeve 160 at one end only of each carriage 24a, 24d and arranging for them at opposite ends of the respective carriages, the same positional accuracy can be achieved. Because only one pair of sleeves is effectively employed, the same single motor 30a can be employed.

Even though only one sleeve is employed in each carriage, nevertheless the same axial deformation of each sleeve can be obtained in order to achieve the requisite positional accuracy. Whereas in FIG. 2 the deformation of the sleeves results in a very slight tension of the screw 32 between them, in this present embodiment, sleeve 160 in carriage 24a places screw 32a in slight tension along its length against its bearing 150a and sleeve 160 in carriage 24d places screw 32d in slight compression along its length against its bearing 150d.

What is claimed is:

1. A workcenter comprising:

a track;

a carriage moveable along the track and having a through bore;

a screw disposed in the track to move the carriage and passing through said bore;

a motor to drive said screw;

at least one sleeve member surrounding said screw and fitted on said carriage;

a circumferential groove formed around said at least one sleeve member;

a spring ring disposed in each of said circumferential groove;

a plurality of segments formed along part of the length and extending to one end of said at least one sleeve member, said segments resiliently compressible by said spring ring toward said screw; and deformable threads formed in the internal circumference of said at least one sleeve member along part of the length said segments; when, such that when said at least one sleeve member is threaded onto said screw said threads are deformed to account for any irregularities in said threading without losing axial tightness of the carriage with respect to said screw.

2. A workcenter as claimed in claim 1, wherein said at least one sleeve member is constructed of deformable plastics.

3. A workcenter as claimed in claim 1, wherein said at least one sleeve member is formed of two halves connected together by mutually engaging studs and socket on each side of each of said halves.

4. A workcenter as claimed in claim 1, wherein the end of said at least one sleeve member which is not segmented forms a closed annulus and a bore.

5. A workcenter as claimed in claim 4, further comprising; a flange formed on the annular end of said at least one sleeve member for abutment against said carriage.

6. A workcenter as claimed in claim 5, further comprising:

a end cap attached to said carriage which clamps said at least one sleeve member to said carriage to prevent independent movement of either said carriage or said at least one sleeve member.

* * * * *